United States Patent [19]
Liskowitz et al.

[11] Patent Number: 5,681,384
[45] Date of Patent: Oct. 28, 1997

[54] METHOD FOR INCREASING THE RATE OF COMPRESSIVE STRENGTH GAIN IN HARDENABLE MIXTURES CONTAINING FLY ASH

[75] Inventors: John W. Liskowitz, Belle Mead; Methi Wecharatana, Parsippany, both of N.J.; Chai Jaturapitakkul, Bangkok, Thailand; Anthony E. Cerkanowicz, deceased, late of Livingston, N.J., by Elizabeth M. Cerkanowicz, executrix

[73] Assignee: New Jersey Institute of Technology, Newark, N.J.

[21] Appl. No.: 427,045

[22] Filed: Apr. 24, 1995

[51] Int. Cl.$^6$ ............................... C04B 7/12; C04B 7/13
[52] U.S. Cl. ................ 106/710; 106/705; 106/709; 106/816; 106/DIG. 1; 264/DIG. 49
[58] Field of Search .................... 106/705, 710, 106/816, DIG. 1, 709; 264/DIG. 49

[56] References Cited

U.S. PATENT DOCUMENTS

| | | | |
|---|---|---|---|
| 2,564,690 | 6/1951 | Havelin et al. | 106/710 |
| 2,803,556 | 8/1957 | Carlsson et al. | 106/709 |
| 3,852,084 | 12/1974 | Webster et al. | 106/DIG. 1 |
| 4,770,709 | 9/1988 | Loggers | 106/710 |
| 4,877,453 | 10/1989 | Loggers | 106/710 |
| 5,435,843 | 7/1995 | Roy et al. | 106/708 |
| 5,439,518 | 8/1995 | Francis et al. | 106/DIG. 1 |

OTHER PUBLICATIONS

Sheu et al., 1990, Symposium Proceedings, Fly Ash and Coal Conversion By–Products: Characterization, Utilization and Disposal VI, Materials Research Society 178: 159–166 No Month.

Ravindrarajah and Tam, 1989, Fly Ash, Silica Fume, Slag, and Natural Pozzolans in Concrete, SP–114, American Concrete Institute, Detroit, pp. 139–155 No Month.

Ukita et al., 1989, Fly Ash, Silica Fume, Slag, and Natural Pozzolans In Concrete, SP–114, American Concrete Institute, Detroit, pp. 219–240 No Month.

ACI Committee 226, 1987, "Use of Fly Ash In Concrete," ACI 226.3R–87, ACI J. Proceedings 84:381–409 No Month.

Aitcin et al, 1986, Fly Ash, Silica Fume, Slag, and Natural Pozzolans in Concrete, SP–91, American Concrete Institute, Detroit, pp. 91–113 No Month.

Hemming and Berry, 1986, Symposium Proceedings, Fly Ash and Coal Conversion By–Products: Characterization, Utilization and Disposal II, Material Research Society 65:91–130 No Month.

He et al., 1984, Cement and Concrete Research 14:505–511 No Month.

Plowman, 1984, Proceedings, 2nd Int'l Conference on Ash Technology and Marketing, London, pp. 437–443 No Month.

Swamy, 1984, Proceedings, 2nd Int'l Conference on Ash Technology and Marketing, London, pp. 359–367 No Month.

Lane and Best, Jul. 1982, Concrete International Jul.:81–92.

Ravina, 1980, Cement and Concrete Research 10:573–580 No Month.

*Primary Examiner*—Anthony Green
*Attorney, Agent, or Firm*—Klauber & Jackson

[57] ABSTRACT

The present invention relates to concrete, mortar and other hardenable mixtures comprising cement and fly ash for use in construction. The invention provides a method for increasing the rate of strength gain of a hardenable mixture containing fly ash by exposing the fly ash to an aqueous slurry of calcium oxide (lime) prior to its incorporation into the hardenable mixture. The invention further relates to such hardenable mixtures, e.g., concrete and mortar, that contain fly ash pre-reacted with calcium oxide. In particular, the fly ash is added to a slurry of calcium oxide in water, prior to incorporating the fly ash in a hardenable mixture. The hardenable mixture may be concrete or mortar. In a specific embodiment, mortar containing fly ash treated by exposure to an aqueous lime slurry are prepared and tested for compressive strength at early time points.

18 Claims, 2 Drawing Sheets

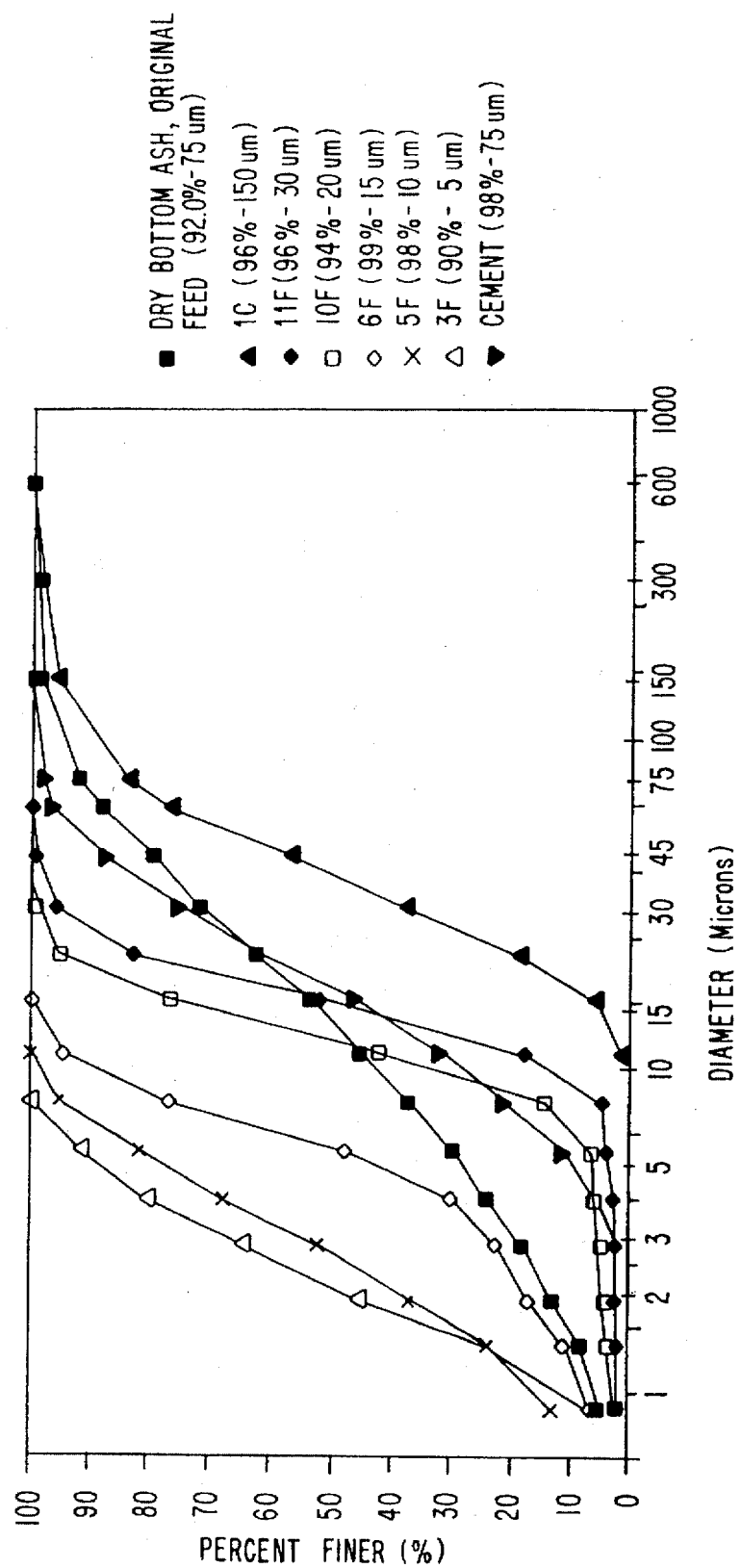

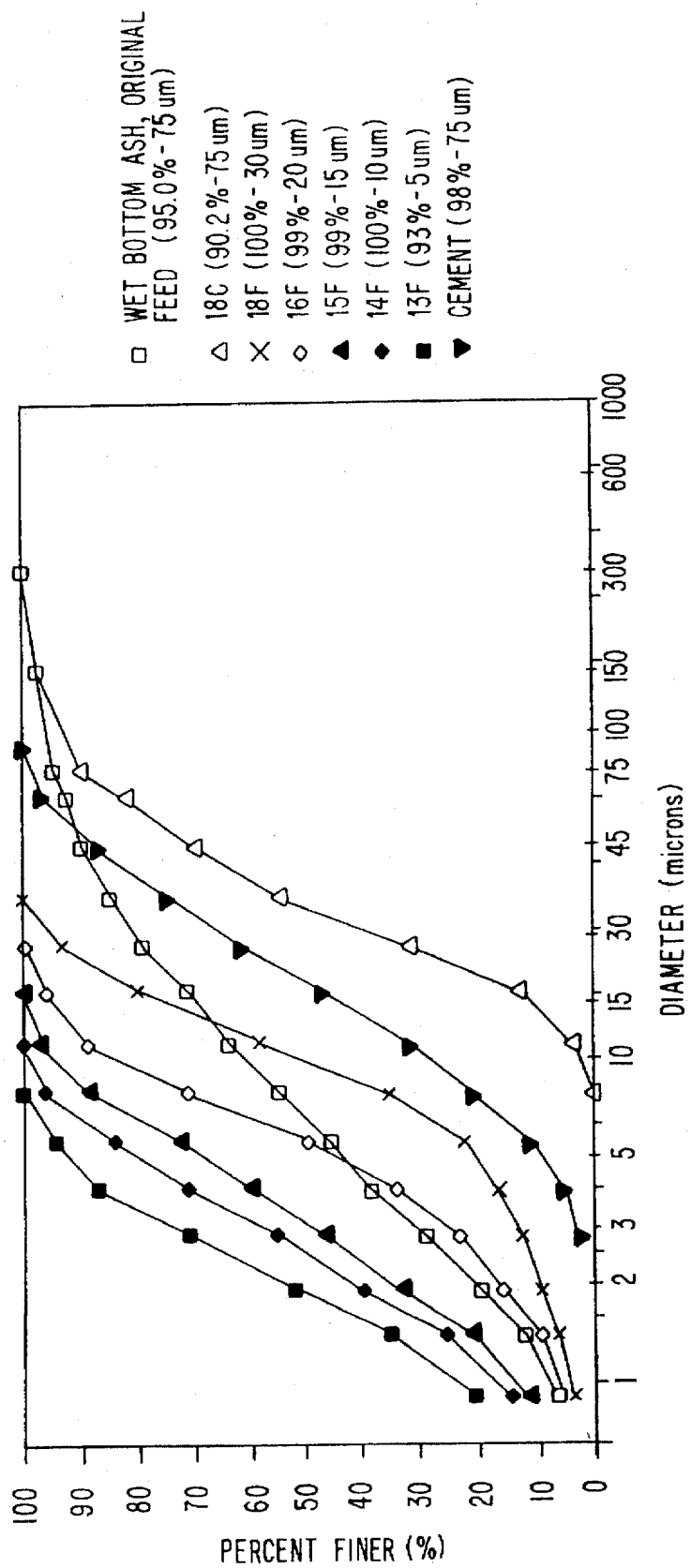

METHOD FOR INCREASING THE RATE OF COMPRESSIVE STRENGTH GAIN IN HARDENABLE MIXTURES CONTAINING FLY ASH

The research leading to the present invention was conducted with Government support under Contract No. DE-FG22-90PC90299 awarded by the Department of Energy. The Government has certain rights in this invention.

FIELD OF INVENTION

The present invention relates to concrete, mortar and other hardenable mixtures comprising cement and fly ash for use in construction. The invention provides a method for increasing the rate of strength gain of a hardenable mixture containing fly ash by exposing the fly ash to calcium oxide slurry or other alkaline material slurry prior to its incorporation into the hardenable mixture. The invention further relates to such hardenable mixtures, e.g., concrete and mortar, that contain fly ash pre-reacted with an alkaline material, e.g., calcium oxide (lime) slurry.

BACKGROUND OF THE INVENTION

Fly ash, a by-product of coal burning power plant, is produced worldwide in large quantities each year. In 1988, approximately 84 million tons of coal ash were produced in the U.S. in the form of fly ash (60.7%), bottom ash (16.7%), boiler slag (5.9%), and flue gas desulfurization (16.7%) (Tyson, 1990, Coal Combustion By-Product Utilization Seminar, Pittsburgh, 15 pp.). Out of the approximately 50 million tons of fly ash generated annually, only about 10 percent is used in concrete (ACI Committee 226, 1987, "Use of Fly Ash In Concrete," ACI 226.3R-87, ACI J. Proceedings 84:381–409) while the remaining portion is mostly disposed of as waste in landfills.

It is generally more beneficial for a utility to sell its ash, even at low or subsidized prices, rather than to dispose of it in a landfill, since this will avoid the disposal cost. In the 1960's and 70's the cost of ash disposal was typically less than $1.00 per ton. However, due to the more stringent environmental regulations starting in the late 1970's, the cost of ash disposal has rapidly increased to from $2.00 to $5.00 per ton and is still rising higher (Bahor and Golden, 1984, Proceedings, 2nd International Conference on Ash Technology and Marketing, London, pp. 133–136). The shortage of landfill due to environmental concerns has further escalated the disposal cost. The Environmental Protection Agency (EPA) estimated in 1987 that the total cost of waste disposal at coal fired power plants ranged from $11.00 to $20.00 per ton for fly ash and bottom ash (Courst, 1991, Proceedings: 9th Int'l Ash Use Symposium, 1:21-1 to 21-10). This increasing trend of disposal cost has caused many concerns and researchers are urgently seeking means for better utilization of fly ash. One potential outlet for fly ash is incorporation in concrete or mortar mixtures.

Fly ash is used in concrete in two distinct ways, one as a replacement for cement and the other as a filler. The first use takes advantage of the pozzolan properties of fly ash, which, when it reacts with lime or calcium hydroxide, can enhance the strength of cementitious composites. However, fly ash is relatively inert and the increase in compressive strength can take up to 90 days to materialize. Also, since fly ash is just a by-product from the power industry, the quality of fly ash has always been a major concern to the end users in the concrete industry.

Incorporation of fly ash in concrete improves workability and thereby reduces the water requirement with respect to the conventional concrete. This is most beneficial where concrete is pumped into place. Among numerous other beneficial effects are reduced bleeding, reduced segregation, reduced permeability, increased plasticity, lowered heat of hydration, and increases setting times (ACI Committee 226, 1987, supra). The slump is higher when fly ash is used (Ukita et al., 1989, SP-114, American Concrete Institute, Detroit, pp.219–240).

However, the use of fly ash in concrete has many drawbacks. For example, addition of fly ash to concrete results in a product with low air entrainment and low early strength development.

As noted above, a critical drawback of the use of fly ash in concrete is that initially the fly ash significantly reduces the compressive strength of the concrete. Tests conducted by Ravindrarajah and Tam (1989, Fly Ash, Silica Fume, Slag, and Natural Pozzolans in Concrete, SP-114, American Concrete Institute, Detroit, pp. 139–155) showed that the compressive strength of fly ash concrete at early ages are lower than those for the control concrete, which is a general property of concrete or mortar when fly ash is added. Most of the reported studies tend to show a lower concrete strength due to the presence of fly ash; none has yet suggested a solution to actually enhance the property of concrete economically. Yet, for fly ash to be used as a replacement for cement, it must be comparable to cement in terms of strength contribution at a point useful in construction. As a practical matter, this means that the fly ash concrete must reach an acceptable compressive strength within about 2 weeks.

Swamy (1984, Proceedings, 2nd Int'l Conference on Ash Technology and Marketing, London, pp. 359–367) showed that 30% replacement by weight, and inclusion of a high dose of a superplasticizer, yielded concrete with material properties and structural behavior almost identical to those of concrete of similar strength without fly ash. However, due to the high cost of superplasticizer, mix proportions were not economical.

U.S. Pat. No. 3,852,084 to Webster refers to a cementitious composition containing a lime-fly ash mixture. The lime and a portion of the fly ash in the mixture are mechanically treated to reduce the particle size and increase the overall reactivity. The activation process described is a dry process using only a portion of the fly ash component of the overall composition.

U.S. Pat. No. 2,564,690 to Havelin refers to the use of fly ash and hydrated lime, that is a powder obtained from quicklime treated with enough water to yield a greater hydration state of the lime, ash as cement in masonry mortar. The combination of fly ash and hydrated lime is disclosed to achieve greater early compressive strength than hydrated lime cement without fly ash.

U.S. Pat. No. 4,877,453 to Loggers refers to a process for increasing the pozzolanic properties of a pozzolanic material such as fly ash by mixing the fly ash with lime and water and heating the mixture thereby resulting in a higher degree of strength after hardening.

U.S. Pat. No. 2,803,556 to Carlsson refers to the grinding of fly ash, lime and cement such that 95% passes through a screen having an operative size of 0.063 mm.

It is critically important in construction to have concrete or mortar that predictably achieves required performance characteristics, e.g., a minimum compressive strength within 14 days. However, the prior art concrete or mortar mixtures that contain fly ash and cement generally have lower compressive strength than concrete or mortar mixtures that lack fly ash. Therefore, there has been a disincentive to use fly ash in such hardenable mixtures.

Accordingly, there is a need in the art for a method for increasing the early rate of compressive strength gain of hardenable mixtures containing fly ash.

There is a further need in the art for such hardenable mixtures that demonstrate an early rate of compressive strength gain.

There is yet a further need in the art for the utilization of fly ash generated during coal combustion.

The citation or identification of any reference in this application shall not be construed as an admission that such reference is available as prior art to the present invention.

SUMMARY OF THE INVENTION

It has now been discovered that the rate of strength gain of a hardenable mixture comprising fly ash can be increased. Accordingly, the invention provides a method for increasing the early rate of compressive strength gain of a hardenable mixture containing fly ash comprising exposing the fly ash to an aqueous slurry of alkaline material, e.g., calcium oxide (CaO), prior to adding the slurry to cement and other components of the hardenable mixture. In particular, the fly ash is added to a slurry of calcium oxide in water, prior to incorporating the fly ash in a hardenable mixture.

The present invention further relates to such hardenable mixtures comprising cement and a preformed slurry of fly ash, alkaline material such as calcium oxide, and water, wherein the fly ash and alkaline material together are about 5% to about 60%, preferably about 10% to about 50%, and more preferably about 30%, by weight of cementitious materials in the hardenable mixture, and cement is about 95% to about 40% by weight of cementitious materials in the hardenable mixture, and wherein the percentage of alkaline material by weight of alkaline material and fly ash ranges from about 5% to about 50%. In a specific embodiment, the hardenable mixture is concrete; in another specific embodiment, the hardenable mixture is mortar. Preferably, the alkaline material is calcium oxide.

The invention further takes advantage of a recent discovery by the inventors named herein, in particular that the compressive strength of a hardenable mixture containing fly ash can be reliably predicted by measuring the fineness modulus of the fly ash. Moreover, hardenable mixtures containing fly ash demonstrate significantly higher compressive strength compared to such mixtures lacking fly ash where a fraction of fly ash having a distribution of particles of finer size, i.e., diameter, is used. This invention is the subject of co-owned, copending application Ser. No. 08/246, 875, filed May 20, 1994, by the inventors named herein, entitled "IMPROVED COMPRESSIVE STRENGTH CONCRETE AND MORTAR CONTAINING FLY ASH," which is incorporated herein by reference in its entirety. Thus, the invention relates to a method for increasing the early rate of compressive strength gain of such mixtures comprising exposing fractionated fly ash having a fineness modulus of less than 600 to calcium oxide prior to incorporating the fly ash in a hardenable mixture, wherein the fineness modulus is calculated as the sum of the percent of fly ash retained on sieves of 0, 1, 1.5, 2, 3, 5, 10, 20, 45, 75, 150, and 300 microns. Preferably, the fly ash is wet bottom boiler fly ash having a fineness modulus of less than about 350 as calculated above.

The invention further relates to hardenable compositions comprising fractionated fly ash that has been treated by exposure to a lime slurry prior to incorporation in a hardenable mixture.

It is a first object of the present invention to provide a method for increasing the early rate of compressive strength gain of a hardenable mixture comprising fly ash.

It is another object of the invention to provide hardenable mixtures characterized by having fly ash that has been treated by exposure to a lime slurry or other alkaline material slurry.

Yet another object of the invention is to provide hardenable mixtures that have greatly increased early and late compressive strength performance characteristics, by using finer fractions of fractionated fly ash in the method and composition of the invention.

These and other objects of the present invention will become more apparent by reference to the following Figures and the accompanying Detailed Description of the Invention.

BRIEF DESCRIPTION OF THE DRAWINGS

FIGS. 1A and 1B present graphs showing the size distribution of fractionated fly ash particles and cement particles (inverted triangles, 98% of which have a diameter of 75µ or less). (A) Dry bottom boiler fly ash (solid square, in which 92% of the particles have a diameter of 75µ or less) and fractions 1C (solid triangle, 95% less than 150µ), 11F (solid diamond, 96% less than 30µ), 10F (open square, 94% less than 20µ), 6F (open diamond, 99% less than 15µ), 5F (X, 98% less than 10µ), and 3F (open triangle, 90% less than 5µ). (B) Wet bottom boiler fly ash (open square, 95% less than 75µ) and fractions 18C (open triangle, 90.2% less than 75µ), 18F (X, 100% less than 30µ), 16F (open diamond, 99% less than 20µ), 15F (99% less than 15µ), 14F (solid diamond, 100% less than 10µ) and 13F (solid square, 93% less than 5µ). Fly ash from dry or wet bottom boilers was collected and fractionated into six different size distribution fractions as described in the Examples, infra.

DETAILED DESCRIPTION

As described above, the present invention relates to a method for increasing the early rate of compressive strength gain of hardenable mixtures comprising fly ash. The method comprises exposing the fly ash to an aqueous slurry of alkaline material, such as calcium oxide (CaO), prior to mixing the fly ash alkaline slurry with the other components of the hardenable mixture. The term "lime" means CaO powder. The invention further relates to hardenable mixtures comprising fly ash that have been treated by exposure to aqueous alkaline material, e.g., lime, as a replacement for cement in cementitious materials, which hardenable mixtures achieve early compressive strength that is about equal to or greater than the compressive strength of similar hardenable mixtures that do not contain aqueous lime in place of cementitious materials. Preferably, the fly ash is fractionated fly ash of a defined fineness modulus, as hereinafter defined.

In the preferred embodiment, a first step in the method of the invention is to prepare a slurry by mixing calcium oxide (CaO) powder in water for at least about 2 to 10 minutes.

In the preferred embodiment, a second step is to add fly ash to the slurry of calcium oxide (CaO) in water forming a fly ash-CaO slurry where the calcium oxide coats the fly ash. Preferably, the fly ash-CaO slurry is allowed to react about 2–10 minutes before adding additional materials.

A third step is to mix the fly ash-CaO-water slurry with cement, fine aggregate, and any other materials of a hardenable mixture, such as concrete or mortar. The percentage of fly ash-CaO is about 5% to about 60% of cementitious materials of the hardenable mixture. The percentage of calcium oxide present in the hardenable mixture is about 5% to about 50% of the amount of fly ash in the hardenable mixture, by weight.

As noted above, the fly ash and calcium oxide together are about 5% to about 60% by dry weight of cementitious materials in the hardenable mixture. That is, these ratios exclude the water in the slurry. Preferably, the fly ash and CaO together are about 10% to about 50% of cementitious materials in the hardenable mixture. In a more preferred embodiment, the fly ash and calcium oxide together are about 30% of the cementitious materials in the hardenable mixture. Accordingly, cement, e.g., portland cement, is about 95% to about 40% by weight of cementitious materials in the hardenable mixture.

As used herein, the term "about" in reference to a quantity of material in the mixture means that proportion of a component of the mixture, within an error range that is acceptable under standard practices in an industry that uses such hardenable mixtures. In the absence of any such standard, the term "about" should be construed to mean ±20% of the stated quantity of material; preferably, the variance indicated by the term about is ±10% of the stated quantity of material.

In particular embodiments, the hardenable mixture can be concrete or mortar, as hereinafter defined.

Throughout this specification, where specific ratios, percentages, or proportions are mentioned, they are determined by weight and not by volume.

The present invention is based, in part, on the observation that regardless of the source and chemical composition of fly ash, pre-treatment of the fly ash by exposure to an aqueous slurry of CaO increases the early rate of compressive strength gain of the hardenable mixture containing the fly ash. The "early rate of compressive strength gain" is the rate of compressive strength gain over the first seven to fourteen days of curing.

Although not intending to be limited by any particular theory or hypothesis, it is believed that this pre-treatment yields a chemically distinct form of fly ash. Fly ash treated by exposure to a lime slurry demonstrates increased pozzolanic properties compared to untreated fly ash, as detected by the increased early rate of compressive strength gain of hardenable mixtures containing treated fly ash. This modification of the early rate of compressive strength gain is evidence that the treated fly ash is chemically distinct from the untreated fly ash.

As used herein, the term "fly ash" refers to a solid material having a chemical composition similar to or the same as the composition of the material that is produced during the combustion of powdered coal. In a specific aspect, the solid material is the material remaining after the combustion of powdered coal. ACI Committee 116 (1990, ACI 116-85, *ACI Manual of Concrete Practice Part I*, American Concrete Institute, Detroit) defines fly ash as "the finely divided residue resulting from the combustion of ground or powder coal which is transported form the firebox through the flue gases," and the term "fly ash" as used herein encompasses this definition. Generally, fly ash derived from various coals have differences in chemical composition, but the principal components of fly ash are $SiO_2$ (25% to 60%), $Al_2O_3$ (10% to 30%), and $Fe_2O_3$ (5% to 25%). The MgO content of fly ash is generally not greater than 5%. Thus, the term fly ash generally refers to solid powders comprising from about 25% to about 60% silica, from about 10% to about 30% $Al_2O_3$, from about 5% to about 25% $Fe_2O_3$, from about 0% to about 20% CaO, and from about 0% to about 5% MgO.

The term "fly ash" further contemplates synthetic fly ash, which may be prepared to have the same performance characteristics as fly ash as described herein.

Presently, fly ash is classified primarily in two groups: Class C and Class F, according to the ASTM C 618 (1990, ASTM C 618-89a, *Annual Book of ASTM Standards*, Vol. 04.02). Class F is generally produced by burning anthracite or bituminous coal, and Class C results from sub-bituminous coal or lignite. Generally, the fly ash from the combustion of sub-bituminous coals contains more CaO and less $Fe_2O_3$ than fly ash from bituminous coal (Berry and Malhotra, 1980, ACI J. Proceedings 77:59–73). Thus, the CaO content of the Class C fly ash is usually higher than 10%, with the sum of the oxides of $SiO_2$, $Al_2O_3$ and $Fe_2O_3$ not less than 50%. For Class F fly ash the CaO content is normally less than 10% and the sum of the above mentioned oxides is not less than 70%.

The glassy phase of fly ash depends essentially on the combustion conditions and type of boiler. Non-fractionated fly ash obtained from different boilers, such as dry bottom boilers or wet bottom boilers, has been found to behave differently. Boilers that achieve higher temperature yield fly ash with a more developed or pronounced glassy phase. Alternatively, combustion in the presence of a fluxing agent, which reduces the fusion temperature of the fly ash, can also increase the glassy phase of fly ash produced by combustion for lower temperature boilers. Compressive strength of a hardenable mixture containing fly ash may depend in part on the glassy phase of the fly ash, so generally fly ash produced for higher temperature boilers, or produced in the presence of a fluxing agent, or both, may be preferred. However, as demonstrated herein, the fineness modulus is the most important parameter for compressive strength after the early curing period, i.e., up to day 7, and fly ash, in particular fractionated fly ash with a defined fineness modulus, from any source, can be used according to the invention.

Although fly ash generally comes in a dry and finely divided form, in many instances, due to weathering and transportation processes, fly ash becomes wet and often forms lumps. Such fly ash can be less reactive.

Pozzolan, as defined by ASTM C 593 (1990, ASTM C 593-89, *Annual Book of ASTM Standards*, Vol. 04.02), is "a siliceous or alumino-siliceous material that in itself possesses little or no cementitious value but that in finely divided form and in the presence of moisture will chemically react with alkali and alkaline earth hydroxides at ordinary temperatures to form or assist in forming compounds possessing cementitious properties."

In a preferred aspect, the present invention relates to the determination of the fineness modulus of fractionated fly ash. As used herein, the term "fineness modulus" refers to a measure of the distribution of volumes of particles of fly ash or distribution of particle sizes of the fly ash. According to the present invention, the fineness modulus is a distribution analysis that is much more informative than an average or median particle diameter determination or total surface area determination. The value of fineness modulus corresponds to the fineness of a fraction of fly ash, or to non-fractionated fly ash. Thus, a fraction of fly ash containing a distribution of particles having smaller size, e.g., a median diameter that falls within a smaller range set, will have a fineness modulus value that is lower than a fraction of fly ash containing a distribution of particles having somewhat larger size, e.g., a median diameter that falls within a larger range set, or non-fractionated fly ash. According to the present invention, lower values of fineness modulus are preferred, since hardenable mixtures that contain fractions having a lower fineness modulus achieve compressive strength gains more rapidly. In another embodiments larger values of fineness modulus may be preferred, where a slower rate of compressive strength gain may be desired. It should be noted that the invention includes inverse values of fineness modulus, obtained by taking the reciprocal or the remainder after subtraction from a greater number of the fineness modulus as discussed above. Such inverse values will of course have an inverse relationship between "fineness modulus" and the range of particle sizes.

Thus, the present invention is directed, in part, to use of fractionated fly ash, in which the fly ash particles in any given fraction have a more uniform distribution of volumes or sizes than non-fractionated fly ash.

Preferably, the fineness modulus is determined as the sum of the percentage of fly ash remaining on each of a series of different sized sieves. Accordingly, the term "fineness modulus" refers to a relative value, which can vary depending on the series of sieves chosen. Since, according to the instant invention, fly ash particles of smaller size or diameter are preferred for use in hardenable mixtures, more accurate determinations of fineness modulus are available if a series of smaller sieves are chosen. Preferably, the size of the sieves is predominantly below 10μ, e.g., the sieves may be 0.5, 1, 2, 3, 4, 5, 6, 7, 8 and 10 microns, with sieves ranging up to 300 microns being useful. The number of sieves sized 10 microns or less should be at least one more than the number of sieves sized greater than 10 microns. In a preferred embodiment, the number of sieves sized 10 microns or less is at least five. Although in a specific embodiment, dry sieves are used to calculate a value for the fineness modulus, other methods, such as wet sieving, can also be used.

The greater the number of sieves sized 10 microns or less, the greater the absolute value of fineness modulus. Accordingly, where sieves of 0.5, 1, 2, 3, 4, 5, 6, 7, 8, and 10 microns are used, the fineness modulus will be a higher absolute number, reflective of the greater degree of accuracy of determination of this value for the smaller diameter or smaller size fly ash particles.

The pozzolanic reaction of fly ash in a hardenable mixture comprising cement is the reaction between constituents of the fly ash and calcium hydroxide. It is generally assumed to take place on the surface of fly ash particles, between silicates and aluminates from the glass phase of the fly ash and hydroxide ion in the pore solution (Plowman, 1984, Proceedings, 2nd Int'l Conference on Ash Technology and Marketing, London, pp. 437–443). However, the result of the research leading to the present invention indicates that the pozzolanic reactions of the ash are dependent on the volume of the fly ash particles: the smaller the particle volume, the more rapidly it completes its reaction with the cement to contribute to compressive strength. The rate of solubility and reactivity of these glassy phases in different types of fly ash depends on the glassy phase of fly ash, which in turn depends on the combustion temperature of the boiler that produced the fly ash and the presence or absence of fluxing reagents during combustion. In addition to the effect of combustion conditions on the glassy phase of fly ash, different fly ashes from one class can behave differently, depending on the $SiO_2$, $Al_2O_3$ and $Fe_2O_3$ content, and other factors such as the particle size distribution and storage conditions of the ash (see Aitcin et al, 1986, Fly Ash, Silica Fume, Slag, and Natural Pozzolans in Concrete, SP-91, American Concrete Institute, Detroit, pp. 91–113; Liskowitz et al., 1983, "Sorbate Characteristic of Fly Ash," Final Report, U.S. Dept. of Energy, Morgantown Energy Technology Center, p. 211).

During hydration, portland cement produces a surfeit of lime (CaO) that is released to the pore spaces. It is the presence of this lime that allows the reaction between the silica components in fly ash and calcium hydroxide to form additional calcium silicate hydrate [C—S—H]. He et al. (1984, Cement and Concrete Research 14:505–511) showed that the content of crystalline calcium hydroxide in the fly ash-portland cement pastes decreases as a result of the addition of fly ash, most likely resulting from a reaction of calcium with alumina and silica from fly ash to form addition C—S—H. This process stabilizes the concrete, reduces permeability and increases resistance to chemical attacks.

However, production of lime from cement for reaction with fly ash in the pore spaces occurs relatively slowly, compared to the reaction of lime with the components of portland cement. Thus, the present invention provides for increasing the rate of reactivity of fly ash early in the curing process by pre-treating the fly ash with aqueous CaO, i.e., a lime slurry. This allows for more rapid early compressive strength gain, compared to hardenable mixtures containing fly ash that has not been treated by exposure to a lime slurry.

Although lime (CaO) is the preferred alkaline material for the slurry for treating fly ash prior to its incorporation in a hardenable mixture, such as mortar or cement, one of ordinary skill in the art will recognize that other alkaline materials can be used instead. Among these alternative alkaline materials for preparation of a slurry are cement kiln dust (which is generally regarded as a waste material), sodium hydroxide, potassium hydroxide, and the like. Therefore, it should be understood that wherever the term, CaO lime, is used, one of the foregoing alkaline materials could be substituted in its place.

Fractionation of fly ash can be accomplished by any means known in the art. Preferably, fractionation proceeds with an air classifying system. In a specific embodiment, infra, a MICRO-SIZER air classifying system was used to fractionate fly ash in six different particle size ranges. In another embodiment, the fly ash can be fractionated by sieving. For example, a 45μ or smaller sieve can be used to select for particles of a defined maximum size. In a further embodiment, the fly ash can be ground to a desired size or fineness.

The term "cement" as used herein refers to a powder comprising alumina, silica, lime, iron oxide and magnesia burned together in a kiln and finely pulverized, which upon mixing with water binds or unites other materials present in the mixture in a hard mixture. The hardenable mixtures of the invention comprise cement. Generally, the term cement refers to hydraulic cements such as, but not limited to, portland cement, in particular portland type I, II, III, IV and V cements.

As used herein, the term "cementitious materials" refers to the portion of a hardenable mixture that provides for binding or uniting the other materials present in the mixture, and thus includes cement and pozzolanic fly ash treated by exposure to a lime slurry. The pre-treated fly ash and CaO in the slurry can comprise from about 5% to about 50% of the cementitious materials in a hardenable mixture of the invention on a dry weight basis; preferably, the fly ash-CaO mixture comprises from about 10% to about 35% of cementitious materials. The balance of cementitious materials will generally be cement, in particular portland cement. In a specific embodiment, infra, the hardenable mixtures of the invention comprise portland type I cement.

The term "concrete" refers to a hardenable mixture comprising cementitious materials; a fine aggregate, such as sand; a coarse aggregate, such as but not limited to crushed basalt coarse aggregate; and water. Concrete of the invention further comprises fly ash treated by exposure to aqueous calcium oxide. In a specific embodiment, the fly ash-CaO makes up from about 10% to about 50% of the cementitious materials. In a further aspect, additional fly ash is used as fine aggregate in a ratio of from about 4:1 to about 1:1 to sand. In yet a further embodiment, the fly ash is an additive in addition to a replacement of cement, or a replacement of cement and fine aggregate.

In specific embodiments, concrete of the invention comprises about 1 part by weight cementitious materials, about 1 to about 3 parts by weight fine aggregate, about 1 to about 5 parts by weight coarse aggregate, and about 0.35 to about 0.6 parts by weight water, such that the ratio of cementitious materials to water ranges from approximately 3:1 to 1.5:1; preferably, the ratio of cementitious materials to water is about 2:1. Water for the concrete of the invention is provided, in part, by introduction of the fly ash-CaO aqueous slurry. In a specific embodiment, the concrete comprises 1 part cementitious materials, 2 parts siliceous river sand or Ottawa sand, 3 parts ⅜" crushed basalt coarse aggregate, and 0.5 parts water.

The term "mortar" refers to a hardenable mixture comprising cementitious materials; a fine aggregate, such as sand; and water. Mortar of the invention further comprises fly ash treated by exposure to aqueous calcium oxide. In a specific embodiment, the fly ash-CaO makes up from about 10% to about 50% of the cementitious materials. In a further aspect, additional fly ash is used as fine aggregate in a ratio of from about 4:1 to about 1:1 to sand. In yet a further embodiment, the fly ash is an additive in addition to a replacement of cement, or a replacement of cement and fine aggregate.

In specific embodiments, mortar of the invention comprises about 1 part by weight cementitious materials, about 1 to about 3 parts by weight fine aggregate, and about 0.5 parts by weight water, such that the ratio of cementitious materials to water is approximately 2:1. Water for the concrete of the invention is provided, in part, by introduction of the fly ash-CaO aqueous slurry. In a specific embodiment, the mortar comprises 1 part cementitious materials, 2.75 parts Ottawa sand, and 0.5 parts water.

As noted above, fly ash can be used as a fine aggregate in concrete or mortar, in addition to having a role as a cementitious material. Such fly ash may be fly ash treated by exposure to an aqueous slurry of CaO; alternatively, untreated fly ash may be used. It has been found that substituting fly ash for a conventional fine aggregate, such as sand, provides the advantages of increased compressive strength of the concrete or mortar since the total amount of fly ash in the hardenable composition is the same, with a more rapid rate of increase of compressive strength because the amount of cement in the cementitious materials is greater.

According to the present invention, the hardenable mixture can further comprise one or more of the following: kiln dust, e.g., the dust generated in the manufacture of cement; silica fume, which is a by-product from the silicon metal industry usually consisting of about 96%–98% reactive $SiO_2$, and which generally comes in very fine particle sizes of less than 1 micron; superplasticizer, such as Daracem-100 (W.R. Grace), an expensive but common additive for concrete used to decrease the water requirement for mixing the concrete; and a dispersing agent, such as sodium hexametaphosphate ($NaPO_3$). The use of a dispersing agent is particularly preferred when weathered fly ash is incorporated in the hardenable mixture.

Addition of silica fume can enhance the early rate of strength gain of a hardenable mixture, and therefore may be a desirable component of hardenable mixtures of the invention.

In a specific embodiment, a hardenable mixture of the invention may also contain glass fibers for reinforcement. The use of glass fibers in hardenable mixtures of the invention for reinforcement can be achieved because the fly ash, particularly finer fractions of fly ash, reacts more readily than glass fibers with reactive components of the cement, e.g., $Ca(OH)_2$, thus preventing long term reaction of the glass fibers with these reactive components, which would otherwise degrade the glass fibers. The most inert hardenable mixtures result are those that contain approximately equal amounts of fly ash, or fly ash and silica fume (as discussed below), and cement. The ability of fly ash to neutralize reactive agents in cement is discussed in greater detail in U.S. application Ser. No. 08/246,861, filed May 20, 1994, entitled "SULFATE AND ACID RESISTANT CONCRETE AND MORTAR" by the instant inventors.

In another specific embodiment, a hardenable mixture of the invention further comprises glass fibers, and silica fume. Silica fume reacts more readily with reactive components of cement than the glass fibers, and thus can provide early desirable protection of the glass fibers from degradation as well as early compressive strength gains. Subsequently, the fly ash will react with such reactive components, thus precluding early and late reactivity of glass fibers. As noted above, reaction of glass fibers with alkali and alkali earth compounds can lead to degradation of the glass fibers, and loss of tensile strength of the hardenable mixture.

Where the hardenable mixture of the invention comprises glass fibers, the amount of CaO used to treat the fly ash is reduced, in order to leave more fly ash reactive with component of the cement that would otherwise react with and degrade the glass fibers. A desirable amount of CaO for use in a slurry for treating the fly ash can be determined empirically.

Concrete beams of the invention with dimensions of 3"×6"×27" can be used to evaluate the bending strength of fly ash concrete, e.g., using simple beam with third-point loading. Preferably, such test procedures are in accordance with ASTM C 78 (1990, ASTM C 78-84, *Annual Book of ASTM Standards*, Vol 04.02).

The present invention will be better understood by reference to the following Example, which is provided by way of exemplification and not by way of limitation.

EXAMPLE

Fly ashes used in this study were collected from a utility in the Northeastern section of the U.S. Fly ashes of different sources named DH, H, M, and P were used in this program. The last sample was obtained in both dry and weathered states as described earlier.

The standard ASTM 2"×2"×2" cube and 3"×6" cylinder specimens for studying the compressive strength of mortar and concrete, respectively, were used. The 3"×6"×27" beam specimens were selected for studying the bending or flexural strength of concrete. All tests were performed on a MTS closed-loop servo hydraulic testing machine.

Materials

Materials used in this study consisted of standard portland cement type I, Ottawa sand, siliceous sand (river sand), coarse aggregate, fly ash, kiln dust, silica fume, superplasticizer, dispersing agent, and water.

Two kinds of sand were used. Graded sand predominantly graded between the No. 300 (0.06 mm) sieve and the No. 100 (0.150 mm) sieve conforming to ASTM C-778 (1990, "Specification for Standard Sand," *Annual Book of ASTM Standards*, Vol. 04.08) was used as a standard sand. Another local siliceous sand (river sand) passing through sieve No. 4 (opening size 4.75 mm) was also used for casting mortar and concrete.

Crushed basalt coarse aggregate size of ⅜" was used for casting concrete.

Wet bottom boiler and dry bottom boiler fly ashes were selected for the study. These two type of fly ashes were further fractionated into different particle sizes for additional study.

Silica fume (produced in the manufacture of microelectronic chips) of very fine particle of size less than 1 micron and 96–98% reactive $SiO_2$ was used in powder form. The addition of silica fume was intended to produce high strength concrete.

Superplasticizer (Daracem-100, W.R. Grace) was used according to standard procedures.

Sodium hexametaphosphate ($NaPO_3$) was normally used as a dispersing agent.

The addition of dispersing agent in the fly ash concrete mix was to ensure the lumps of weathered fly ash were dispersed into fine particles and could as a result, be more reactive.

Tap water was used throughout.

The chemical composition of fly ashes and cement were determined by X-Ray Fluorescence (ASTM D-4326 1990, "Test Method for Major and Minor Elements in Coal and Coke Ash by X-Ray Fluorescence," *Annual Book of ASTM Standards*, Vol. 05.05).

Fly Ash Fineness

The fineness of fly ash was measured using two different standard methods; the Blaine air permeability and the fineness by the 45 microns (No. 325 sieve). Fineness was also determined as the fineness modulus, as described.

For the Blaine air permeability (Blaine fineness), the fineness was expressed in terms of the specific surface, expressed as total surface area in square centimeters per gram, or square meters per kilogram, of fly ash. The result obtained from the Blaine method was a measure of relative fineness rather than absolute fineness. The test procedure followed ASTM C 204 (1990, "Test Method for Fineness of Portland Cement," ASTM C 204-89, *Annual Book of ASTM Standards*, Vol. 04.01).

The fineness of fly ash retained on the sieve 45 microns (No. 325 sieve) was determined by the amount of fly ash retained when wet sieved on the No. 325 sieve in accordance with the ASTM C 430 (1990, "Test Method for Fineness of Hydraulic Cement by the 45-Micron (No. 325) Sieve," ASTM C 430-89, *Annual Book of ASTM Standards*, Vol. 04.01) test method for hydraulic cement.

Fineness modulus was determined by the summation of the percentage of fly ash that retained on the following sieve sizes: 0, 1, 1.5, 2, 3, 5, 10, 20, 45, 75, 150, and 300 microns.

Fly Ash Mortar

DH, H, dry, and weathered fly ashes were mixed with cement and Ottawa sand. The replacement of a portion of portland cement by fly ash varied as 0%, 15%, 25% and 35% by weight of cementitious (cement+fly ash) materials. The specimens were mixed and cast in accordance with ASTM C 109 (1990, "Test Method for Compressive Strength of Hydraulic Cement Mortars . . . ," ASTM C 109-88, *Annual Book of ASTM Standards*, Vol. 04.01). All specimens were cured in saturated lime water and tested at the age of 1, 3, 7, 14, 28, 56, and 90 days.

Fractionated Fly Ash Concrete and Mortar

Dry and wet bottom boiler fly ashes were separated into different particle sizes by using the Micro-Sizer Air Classifying System. The fly ash was fractionated into six particle size distributions. The fractionated fly ashes and the original feed fly ashes were used to replace 15%, 25% 35% and 50% of cement by weight of cementitious materials. The compressive strengths of fractionated fly ash concrete were tested from 1 day to 180 days. The effect of particle size from 0–5, 0–10, 0–15, 0–20, 0–30, 0–44 microns, and the original feed fly ashes, were investigated and compared with the control concrete. The 3"×6" cylinder was used to determine the compressive strength of fractionated fly ash concrete. The standard size of 2"×2"×2" cube was used to determine the compressive strength of fractionated fly ash mortars. The mix proportion of fractionated fly ash mortar is shown in Table 1.

TABLE 1

Mix Proportion of Fractionated Fly Ash Mortar

| Ingredients | Fractionated Fly Ash (Dry and Wet Bottom Boiler) By Weight | | | |
|---|---|---|---|---|
| | 0 | 15% | 25% | 50% |
| Cement | 1.00 | 0.85 | 0.75 | 0.50 |
| Fly Ash | — | 0.15 | 0.25 | 0.50 |
| Sand | 2.75 | 2.75 | 2.75 | 2.75 |
| Water | 0.50 | 0.50 | 0.50 | 0.50 |
| Water/(Cem + FA) | 0.50 | 0.50 | 0.50 | 0.50 |

Chemical Composition of Fractionated Fly Ashes

The chemical composition of fractionated fly ashes are shown in Table 3. Sample CEM is the cement sample used in this study. Samples DRY and WET are the fly ashes from the original feed of dry and wet bottom boiler ashes, respectively. 3F is the finest fly ash sample of the dry bottom boiler ash and 13F is the finest sample of the wet bottom boiler ash. The coarsest fly ashes samples of dry and wet bottom boiler ash are 1C and 18C, respectively.

Both wet and dry bottom boiler fly ashes used herein were classified as Class F fly ash according to ASTM C-618 (1990, supra). Most of the fractionated fly ashes varied slightly in the oxide composition with changes in particle size. It has been reported that separation of Class F (high calcium) fly ash into size fractions does not result in significant chemical, morphological or mineralogical specification between particles (Hemming and Berry, 1986, Symposium Proceedings, Fly Ash and Coal Conversion By-Products: Characterization, Utilization and Disposal II, Material Research Society 65:91–130). The $SiO_2$ content tends to be lower when the particle size is larger. Differences in chemical compositions of the two fly ashes were observed in the $SiO_2$, $Fe_2O_3$, and CaO contents. Samples of the dry bottom boiler fly ash were about 10% richer in $SiO_2$ than the wet bottom boiler fly ash. The CaO content of the dry bottom boiler fly ash varied from 1.90% to 2.99%, while for wet bottom boiler fly ash, the CaO varied from 6.55% to 7.38%. $Fe_2O_3$ content of wet bottom boiler fly ash was about twice as high in wet bottom boiler than dry bottom boiler fly ash. The highest concentration of $Fe_2O_3$ of each type of fly ashes was observed in the coarsest particle sizes, i.e., 1C and 18C. Chemical composition of the fly ashes is shown in Table 2.

microns. The median diameter of the particles in each fraction was determined from the curves in FIGS. 1A and 1B by extrapolating from the 50% percent finer value. The median diameters of 3F and 13F were 2.11 and 1.84 microns, respectively, while the median diameters of the coarsest particle size, 1C and 18C, were 39.45 and 29.23

TABLE 2

Chemical Composition of Fractionated Fly Ashes and Cement Chemical Composition (%)

| Sam | LOI | $SO_3$ | $SiO_2$ | $Al_2O_3$ | $Fe_2O_3$ | CaO | $K_2O$ | MgO | $Na_2O$ |
|---|---|---|---|---|---|---|---|---|---|
| CEM | 0.73 | 2.53 | 20.07 | 8.84 | 1.41 | 60.14 | 0.86 | 2.49 | 0.28 |
| 3FO | 4.97 | 1.69 | 49.89 | 26.94 | 5.43 | 2.99 | 1.76 | 0.99 | 0.33 |
| 5F | 4.10 | 1.53 | 50.27 | 26.74 | 5.30 | 2.95 | 1.74 | 0.93 | 0.33 |
| 6F | 3.12 | 1.09 | 51.40 | 26.54 | 4.91 | 2.72 | 1.71 | 0.74 | 0.31 |
| 10F | 2.52 | 0.72 | 51.98 | 26.23 | 4.44 | 2.28 | 1.60 | 0.54 | 0.29 |
| 11F | 2.04 | 0.53 | 51.27 | 26.28 | 4.42 | 2.02 | 1.55 | 0.49 | 0.26 |
| 1C | 1.46 | 0.39 | 53.01 | 26.50 | 5.66 | 1.90 | 1.61 | 0.56 | 0.24 |
| DRY | 2.75 | 0.98 | 52.25 | 26.72 | 5.43 | 2.41 | 1.67 | 0.69 | 0.28 |
| 13F | 2.67 | 3.81 | 38.93 | 24.91 | 12.89 | 6.85 | 2.10 | 1.55 | 1.31 |
| 14F | 1.94 | 3.47 | 39.72 | 25.08 | 13.02 | 6.71 | 2.11 | 1.50 | 1.31 |
| 15F | 1.88 | 3.33 | 40.25 | 25.02 | 13.12 | 6.60 | 2.11 | 1.47 | 1.30 |
| 16F | 2.06 | 3.05 | 40.65 | 24.92 | 13.26 | 6.55 | 2.09 | 1.41 | 1.26 |
| 18F | 1.94 | 2.94 | 41.56 | 24.47 | 14.21 | 6.58 | 2.01 | 1.40 | 1.17 |
| 18C | 2.55 | 2.40 | 43.25 | 23.31 | 17.19 | 7.38 | 2.00 | 1.30 | 0.88 |
| WET | 2.05 | 3.13 | 41.54 | 24.74 | 14.83 | 6.89 | 2.07 | 1.43 | 1.17 |

It is interesting to note that after fly ash was fractionated into different sizes, loss of ignition (LOI) of the finest particle was higher than for larger particles. In other words, the LOI content gradually decreased as the particle size increased. Ravina (1980, Cement and Concrete Research 10:573–80) also reported that the finest particle of fly ashes has the highest LOI values. Ukita et al. (1989, Fly Ash, Silica Fume, Slag, and Natural Pozzolans In Concrete, SP-114, American Concrete Institute, Detroit, pp. 219–40) also showed that although chemical composition did not change when the median diameter of fly ash decreased from 17.6 microns to 3.3 microns, LOI increased from 2.78 to 4.37.

Our observations and these prior reports conflict with the report of ACI Committee 226 (1987, "Use of Fly Ash In Concrete," ACI 226.3R-87, ACI J. Proceedings 84:381–409) and of Sheu et al. (1990, Symposium Proceedings, Fly Ash and Coal Conversion By-Products: Characterization, Utilization and Disposal VI, Materials Research Society 178:159–166), which state that the coarse fraction of fly ash usually has a higher LOI than the fine fraction.

Particle Size Analysis of Fractionated Fly Ashes

The particle size distributions of fractionated fly ashes from the dry and wet bottom boilers are shown in FIGS. 1A and 1B, respectively. The curves for the original feed fly ashes are not as steep as others since the non-fractionated original feed ash includes the entire range of sizes, and thus a wider range of size distributions than fractionated samples.

The percentage of fly ash in each fraction having a size less than a particular size is indicated in parentheses in each curve. For example, in case of the 3F fly ash, the finest of dry bottom boiler fly ash, 3F (90%—5 µm) means that 90% of the fly ash particles are smaller than 5 microns.

From the original feed, each type of fly ash was fractionated into six ranges. As shown in FIGS. 1A and 1B, the particle size of fly ash varied from 0–5.5 micron to 0–600 microns, respectively. For wet bottom boiler fly ash, 13F was the finest fraction and 18C was the coarsest.

The original feed of wet bottom boiler fly ash was found to be finer than the original feed of dry bottom boiler fly ash. The particle sizes of original feed of dry bottom boiler fly ash varied from about 1 micron to 600 microns, with a median particle size of 13.73 microns. The original feed of wet bottom boiler fly ash included particles up to 300 microns with a median diameter of 6.41 microns. Particles from the smaller size fractions tend to have a more spherical shapes (Hemming and Berry, 1986, supra).

Density of fly ash from different electric generating plants varies from 1.97 to 2.89 g/cm³ but normally ranges between about 2.2 to 2.7 g/cm³ (Lane and Best, 1982, supra). Work done by McLaren and Digiolin (1990, Coal Combustion and By-Product Utilization Seminar, Pittsburgh, p. 15) reported that Class F fly ash had a mean specific gravity value of 2.40. The specific gravity of fractionated fly ashes varies from 2.28 for the coarsest fly ash to 2.54 for the finest fly ash for dry bottom boiler fly ash, and from 2.22 for the coarsest to 2.75 for the finest wet bottom boiler fly ash.

The differences in density between dry bottom boiler and wet bottom boiler fly ashes suggest that the very fine particles of wet bottom boiler fly ash are thick-walled, void free, or composed of more dense glasses and crystalline components than dry bottom boiler fly ash (Hemming and Berry, 1986, Symposium Proceedings, Fly Ash and Coal Conversion By-Products: Characterization, Utilization and Disposal II, Material Research Society 65:91–103).

Effect of Calcium Oxide (CaO) on the Strength of Fractionated Fly Ash Mortar

The fractionated fly ashes, 6F, 16F, 1C, 18C, and the non-fractionated dry and wet bottom boiler fly ashes, were used to form cement mortar. Calcium oxide was added into the mix in 10%, 20%, and 30% by weight of fly ash+calcium oxide. First, calcium oxide was allowed to absorb the mixing water for 3 to 5 minutes, followed by mixing of the CaO-water slurry. Fly ash, either non-fractionated or fractionated, was then added into the mixer and mixed with the calcium oxide slurry. The fractionated fly ash mortar with calcium oxide was cast, cured, and tested for compressive strength over a period of 180 days. The mix proportion of fractionated fly ash mortar with calcium oxide is shown in Table 3.

TABLE 3

Mix proportions of Fly Ash Mortar with CaO Slurry

| Sam No. | Type of Fly Ash | Mix Proportion | | | CaO/(Fly Ash + CaO) (%) |
|---|---|---|---|---|---|
| | | Cement | CaO | Fly Ash | |
| CA0 | — | 1.00 | — | — | 0 |
| DCA0 | Dry | 0.65 | — | 0.350 | 0 |
| DCA10 | Dry | 0.65 | 0.035 | 0.315 | 10 |
| DCA20 | Dry | 0.65 | 0.700 | 0.280 | 20 |
| DCA30 | Dry | 0.65 | 0.105 | 0.245 | 30 |
| WCA0 | Wet | 0.65 | — | 0.350 | 0 |
| WCA10 | Wet | 0.65 | 0.035 | 0.315 | 10 |
| WCA20 | Wet | 0.65 | 0.700 | 0.280 | 20 |
| WCA30 | Wet | 0.65 | 0.105 | 0.245 | 30 |
| 6CA0 | 6F | 0.65 | — | 0.350 | 0 |
| 6CA10 | 6F | 0.65 | 0.035 | 0.315 | 10 |
| 6CA20 | 6F | 0.65 | 0.700 | 0.280 | 20 |
| 6CA30 | 6F | 0.65 | 0.105 | 0.245 | 30 |
| 16CA0 | 18F | 0.65 | — | 0.350 | 0 |
| 16CA10 | 18F | o.65 | 0.035 | 0.315 | 10 |
| 16CA20 | 18F | 0.65 | 0.700 | 0.280 | 20 |
| 16CA30 | 18F | 0.65 | 0.105 | 0.245 | 30 |
| 1CA0 | 1C | 0.65 | — | 0.350 | 0 |
| 1CA10 | 1C | 0.65 | 0.035 | 0.315 | 10 |
| 1CA20 | 1C | 0.65 | 0.700 | 0.280 | 20 |
| 1CA30 | 1C | 0.65 | 0.105 | 0.245 | 30 |
| 18CA0 | 18C | 0.65 | — | 0.350 | 0 |
| 18CA10 | 18C | 0.65 | 0.035 | 0.315 | 10 |
| 18CA20 | 18C | 0.65 | 0.700 | 0.280 | 20 |
| 18CA30 | 18C | 0.65 | 0.105 | 0.245 | 30 |
| CA10 | — | 0.965 | 0.035 | — | 0 |
| CA20 | — | 0.930 | 0.070 | — | 0 |
| CA30 | — | 0.985 | 0.105 | — | 0 |

Note: Water/(Cement + CaO + Fly Ash) = 0.50
(Cement + Fly Ash + CaO):Sand Ratio = 1:2.75

Results

In this Example, the objective was to accelerate the early strength of fly ash mortar by treating fly ash with an aqueous calcium oxide (CaO) slurry prior to adding the fly ash-CaO slurry to the other components of the mortar. Calcium oxide, in the powder form with a purity more than 98%, was used to increase the calcium oxide content in the fly ash. The percentage of fly ash plus calcium oxide in the mix was kept constant at 35% by weight of the cementitious (cement+fly ash+calcium oxide) materials. The percentage of CaO was varied, however, between 10% and 30% of the fly ash-CaO portion of cementitious materials.

The mix proportions of cement, CaO and fly ash of the various samples prepared for testing in this experiment are summarized in Table 3. CA0, which was the cement mortar sample without any fly ash or calcium oxide, was the control sample. DCA0 and WCA0 were the samples of fly ash mortar mixed with the non-fractionated dry bottom boiler and wet bottom boiler fly ashes, respectively. The numbers at the end of the sample, i.e. "0", "10", "20", and "30" represent the percentage of calcium oxide in the mix by weight of fly ash+calcium oxide.

Control samples CA10, CA20, and CA30 were prepared by replacing cement with calcium oxide at 3.5%, 7.0%, and 10.5%, respectively, by weight of cementitious materials, i.e., cement+calcium oxide. These samples contained no fly ash. The amounts of calcium oxide used to replace the cement in samples CA10, CA20, and CA30 was the same as in the samples containing fly ash, in which the fly ash-CaO content was 10%, 20%, and 30%, respectively. In this case, cement was used in place of fly ash in the final composition (the cement was not treated by mixing the equivalent portion in the lime slurry).

The results of this experiment are reported in Table 4. Compressive strength of the various mortar samples was determined at times ranging from 1 day to 28 days of curing. The data in Table 4 are reported as the percentage of compressive strength of a sample relative to the control sample, CA0. As expected, the early values of compressive strength of the untreated fly ash samples (CaO=0) were lower than the compressive strength of the control sample for all times tested. Pre-treatment of the fly ash with aqueous CaO, however, greatly increased the early compressive strength values compared to untreated samples.

TABLE 4

Compressive Strength of CaO-Treated Fly Ash Mortar

| Sample Number | Percentage Compressive Strength (%) | | | | |
|---|---|---|---|---|---|
| | 1-day | 3-day | 7-day | 14-day | 28-day |
| CAO* | 2224 | 5565 | 7586 | 8487 | 9216 |
| DCA0 | 43.6 | 52.7 | 58.2 | 61.7 | 73.9 |
| DCA10 | 54.5 | 60.8 | 61.9 | 65.3 | 75.5 |
| DCA20 | 76.3 | 66.9 | 66.7 | 73.1 | 78.6 |
| DCA30 | 89.6 | 76.4 | 72.1 | 73.9 | 81.4 |
| WCA0 | 46.4 | 63.6 | 62.6 | 70.0 | 83.3 |
| WCA10 | 60.1 | 69.8 | 68.8 | 71.6 | 84.3 |
| WCA20 | 93.3 | 75.7 | 70.3 | 75.0 | 85.1 |
| WCA30 | 103.1 | 82.6 | 76.6 | 76.2 | 86.8 |
| 6CA0 | 45.5 | 55.7 | 59.1 | 64.7 | 79.5 |
| 6CA10 | 67.3 | 62.9 | 63.9 | 70.7 | 80.9 |
| 6CA20 | 67.7 | 66.3 | 66.7 | 72.9 | 81.2 |
| 6CA30 | 81.5 | 71.8 | 69.1 | 73.8 | 82.2 |
| 16CA0 | 52.2 | 65.3 | 65.3 | 71.3 | 81.7 |
| 16CA10 | 72.4 | 68.4 | 69.0 | 72.5 | 83.4 |
| 16CA20 | 91.0 | 75.2 | 70.8 | 76.1 | 83.3 |
| 16CA30 | 105.3 | 84.4 | 78.0 | 79.3 | 87.8 |
| 1CA0 | 36.5 | 47.8 | 51.9 | 57.1 | 61.6 |
| 1CA10 | 59.3 | 56.2 | 56.4 | 60.3 | 65.5 |
| 1CA20 | 59.4 | 57.9 | 58.1 | 61.2 | 65.9 |
| 1CA30 | 91.2 | 68.9 | 68.3 | 67.5 | 69.2 |
| 18CA0 | 37.8 | 56.4 | 57.2 | 61.2 | 65.7 |
| 18CA10 | 54.7 | 57.3 | 59.0 | 63.2 | 66.6 |
| 18CA20 | 66.3 | 58.9 | 57.6 | 62.7 | 66.4 |
| 18CA30 | 97.7 | 74.2 | 68.5 | 69.7 | 71.2 |
| CA10 | 111.7 | 92.7 | 91.7 | 93.5 | 90.0 |
| CA20 | 134.4 | 102.4 | 95.1 | 95.3 | 92.1 |
| CA30 | 153.8 | 105.7 | 96.0 | 93.6 | 91.7 |

*The values for the control sample, CAO, are the actual compressive strength in psi. These values represent 100 % on the table.

These results are illustrated by examination of particular data points. In the samples containing non-fractionated dry bottom boiler fly ash, the compressive strength at 1 day of DCA0 (fly ash mortar without calcium oxide) was 970 psi; this value increased to 1993 psi in sample DCA30, which contains fly ash and 30%. Thus, treating the fly ash (a lower amount, since fly ash is replace with CaO) with aqueous CaO increases the compressive strength of the non-fractionated dry bottom boiler fly ash mortar from 43.6% to 89.6% of the control strength.

Similar results were observed for non-fractionated wet bottom boiler fly ash. For these samples, the 1 day strength increased from 1033 psi for WCA0 (0% CaO) to 2294 psi for sample WCA30, in which contains 30% calcium oxide as a percentage of the fly ash and Ca). Thus, treatment of the fly ash with aqueous CaO increased the compressive strength at 1 day by about 2-fold compared to that of the sample without the addition of calcium oxide.

These results were also observed with the samples prepared with fractionated fly ash samples. The fractions tested were the 6F, 16F, 1C, and 18C fly ashes (see Table 1, supra).

The increase in compressive strength of fly ash mortar by treating the fly ash with an aqueous slurry of calcium oxide was most apparent at the early curing times, i.e., up to 14 days. By 28 days, the differences between the compressive strengths of the samples prepared with and without the addition of calcium oxide was not significant. For example, the values of compressive strength at 28 days for sample DCA0 and DCA30 (prepared with non-fractionated dry bottom boiler fly ash) were 6813 psi and 7506 psi, respectively, or 73.9% and 81.4%, respectively, of the control strength. For the fractionated fly ash mortars, prepared with fractions 6F, 16F, 1C, and 18C, the strength of fly ash mortar prepared with fly ash treated with the calcium oxide slurry, in which the amount of CaO as a percentage of fly ash+CaO varied from 10% to 30% by weight, was slightly greater than that of the mortar samples prepared without calcium oxide.

Control samples containing CaO but no fly ash were also evaluated. Sample CA10 (replacement of cement with calcium oxide, in which the CaO is 3.5% by weight of cement+calcium oxide) yielded compressive strength at 1 day of 2485 psi, or 111.7% of the control mortar. The other samples, CA20 and CA30, also produced higher strengths than the control strength. The percentage compressive strengths of CA20 and CA30 were 134.4% and 153.8%, respectively, compared to the control mortar. The rate of compressive strength gain in these samples slowed after 3 days; by day 7 of curing, the compressive strength of the CaO-containing samples was lower than the control. The compressive strengths of samples CA10, CA20, and CA30 at 7 days were 91.7%, 95.1%, and 96.0% respectively, of the control strength. At 28 days, the values of compressive strength of the samples in which cement was replaced with calcium oxide were about 90% of that of the control mortar.

Increased early compressive strength was observed in the samples in which fly ash was treated by mixing in a CaO slurry prior to mixing the mortar. The presence of the reactive lime slurry accelerates the rate of reaction of fly ash and results in an early strength gain of the fly ash-lime slurry-cement mixtures.

In addition, during the mixing period of calcium oxide and water, the chemical reaction between calcium oxide and water releases energy in the form of heat. This heat may accelerate the hydration process of the cement, thus giving a higher strength at the early ages than the sample without added calcium oxide.

It was also found that with a constant of water to cementitious materials ratio, a higher content of calcium oxide in the mix made the sample less workable than the control cement-mortar mix.

Based on the results above, it can be concluded that the use of calcium oxide to replace cement can accelerate the rate of compressive strength gain at 1 day, but has no effect, or even a slightly negative, after 7 days when compared to the strength of the control mortar.

The present invention is not to be limited in scope by the specific embodiments describe herein. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

What is claimed is:

1. A method for increasing the early rate of strength gain of a hardenable mixture containing fly ash comprising exposing fly ash to an aqueous slurry of an alkaline material prior to incorporation of the fly ash in a hardenable mixture, wherein the fly ash is characterized by at least 99% of the particles having a particle size of less than 20 microns and having a fineness defined by a fineness modulus of less than about 600, wherein the fineness modulus is calculated as the sum of the percent of fly ash retained on sieves of 0, 1, 1.5, 2, 3, 5, 10, 20, 45, 75, 150, and 300 microns.

2. The method according to claim 1 wherein the alkaline material coats the fly ash.

3. The method according to claim 1 wherein exposing the fly ash to the alkaline material comprises adding fly ash to a slurry of alkaline material in water, thereby forming a fly ash-alkaline material water slurry.

4. The method according to claim 3 further comprising incorporating the fly ash in a hardenable mixture by mixing the fly ash-alkaline material water slurry with cement and fine aggregate, whereby mortar is formed.

5. The method according to claim 3 further comprising incorporating the fly ash in a hardenable mixture by mixing the fly ash-alkaline material water slurry with cement, fine aggregate and coarse aggregate, whereby concrete is formed.

6. The method according to claim 1 further comprising incorporating the fly ash exposed to alkaline material with cement in a hardenable mixture, wherein the fly ash and alkaline material is about 5% to about 60%, by weight, of cementitious materials of the hardenable mixture, wherein the cementitious materials comprise cement and fly ash.

7. The method according to claim 1 wherein the amount of alkaline material present in the hardenable mixture is about 5% to about 50% of the amount of fly ash in the hardenable mixture, by weight.

8. The method according to claim 3 wherein the slurry is prepared by mixing the alkaline material in water for at least about 2 to about 10 minutes.

9. The method according to claim 1 wherein the fly ash is wet bottom boiler fly ash having a fineness modulus of less than about 350.

10. The method according to claim 1 wherein the alkaline material is calcium oxide.

11. The method according to claim 2 wherein the alkaline material is calcium oxide.

12. The method according to claim 3 wherein the alkaline material is calcium oxide.

13. A hardenable mixture comprising cement and a preformed slurry of fly ash, alkaline material and water, wherein the fly ash and alkaline material together are about 5% to about 60% by weight of cementitious materials in the hardenable mixture, wherein the cementitious materials comprise cement and fly ash, and wherein the fly ash the fly ash is characterized by at least 99% of the particles having a particle size of less than 20 microns and having a fineness defined by a fineness modulus of less than about 600, wherein the fineness modulus is calculated as the sum of the percent of fly ash retained on sieves of 0, 1, 1.5, 2, 3, 5, 10, 20, 45, 75, 150, and 300 microns.

14. The hardenable mixture of claim 13 wherein the fly ash and alkaline material together are about 30% of the cementitious materials in the hardenable mixture.

15. The hardenable mixture of claim 13 wherein the fly ash is wet bottom boiler fly ash having a fineness modulus of less than about 350.

16. The hardenable mixture of claim 13 which is concrete.

17. The hardenable mixture of claim 13 which is mortar.

18. The hardenable mixture of claim 13 wherein the alkaline material is calcium oxide, and wherein the percentage of calcium oxide and fly ash ranges from about 5% to about 50% of cementitious materials.

* * * * *